United States Patent
Park et al.

(10) Patent No.: US 9,497,683 B2
(45) Date of Patent: Nov. 15, 2016

(54) HANDOVER METHOD AND APPARATUS

(71) Applicant: Electronics and Telecommunications Research Institute, Daejeon (KR)

(72) Inventors: Hyun Seo Park, Daejeon (KR); Sung-Min Oh, Daejeon (KR); Ae-Soon Park, Daejeon (KR); Eunah Kim, Daejeon (KR); Sook Yang Kang, Daejeon (KR); JaeSheung Shin, Daejeon (KR); Pyeong Jung Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/417,012

(22) PCT Filed: Jul. 24, 2013

(86) PCT No.: PCT/KR2013/006652
§ 371 (c)(1),
(2) Date: Jan. 23, 2015

(87) PCT Pub. No.: WO2014/017838
PCT Pub. Date: Jan. 30, 2014

(65) Prior Publication Data
US 2015/0181493 A1 Jun. 25, 2015

(30) Foreign Application Priority Data

Jul. 24, 2012 (KR) .................. 10-2012-0080776
Oct. 12, 2012 (KR) .................. 10-2012-0113771
Jun. 20, 2013 (KR) .................. 10-2013-0071041
Jul. 9, 2013 (KR) .................. 10-2013-0080593
Jul. 23, 2013 (KR) .................. 10-2013-0087008

(51) Int. Cl.
*H04W 36/24* (2009.01)
*H04W 36/08* (2009.01)
(Continued)

(52) U.S. Cl.
CPC ............ *H04W 36/24* (2013.01); *H04W 36/08* (2013.01); *H04W 36/30* (2013.01); *H04W 36/36* (2013.01)

(58) Field of Classification Search
CPC .... H04W 36/24; H04W 36/30; H04W 36/08
USPC .................. 455/436–442; 370/331, 332
See application file for complete search history.

(56) References Cited

U.S. PATENT DOCUMENTS 8,131,295 B2  3/2012  Wang et al.
2008/0096564 A1  4/2008  Jung et al.
(Continued)

FOREIGN PATENT DOCUMENTS

KR  1020070046404 A  5/2007
KR  1020080035822 A  4/2008
(Continued)

OTHER PUBLICATIONS

Early HO Preparation with Ping-Pong Avoidance, 3GPP TSG-RAN WG2 #83, R2-132612, Aug. 2013, ETRI, Barcelona, Spain.
(Continued)

*Primary Examiner* — Sam Bhattacharya
(74) *Attorney, Agent, or Firm* — William Park & Associates Ltd.

(57) ABSTRACT

A UE does not immediately perform handover after receiving a handover command from a serving base station, but instead backups that message and continuously compares the signal strength of a serving base station and the signal strength of a target base station and performs a handover to the target base station at the best timing when handover is required. Once the timing of handover is determined, the UE transmits a handover indication message to the serving base station, and thereafter the UE performs a handover to the target base station.

20 Claims, 15 Drawing Sheets

(51) Int. Cl.
*H04W 36/30* (2009.01)
*H04W 36/36* (2009.01)

(56) References Cited

U.S. PATENT DOCUMENTS

| | | |
|---|---|---|
| 2008/0108326 A1 | 5/2008 | Park et al. |
| 2009/0111470 A1 | 4/2009 | Thakare |
| 2009/0219894 A1 | 9/2009 | Jee et al. |
| 2010/0034173 A1 | 2/2010 | Luo et al. |
| 2010/0144355 A1 | 6/2010 | Jin et al. |
| 2011/0281581 A1 | 11/2011 | Brandt et al. |
| 2012/0002637 A1 | 1/2012 | Adjakple et al. |
| 2013/0100931 A1 | 4/2013 | Kim |

FOREIGN PATENT DOCUMENTS

| | | |
|---|---|---|
| KR | 1020080041535 A | 5/2008 |
| KR | 1020080041576 A | 5/2008 |
| KR | 1020080076164 A | 8/2008 |
| KR | 1020100048881 A | 5/2010 |
| KR | 101006391 B1 | 1/2011 |
| KR | 1020110120822 A | 11/2011 |

OTHER PUBLICATIONS

Hyun-Seo Park et al., Two-Step Handover for LTE HetNet Mobility Enhancements, ICTC, 2013, P-1.29, ETRI.

Francesc Boixadera, "Radio Resource Management," LTE—The UMTS Long Term Evolution: From Theory to Practice, Feb. 20, 2009, pp. 301-321, John Wiley & Sons, Ltd., Chichester, UK.

Mieszko Chmiel et al., "LTE-Advanced," LTE for UMTS: Evolution to LTE-Advanced, Mar. 4, 2011, pp. 487-519, John Wiley and Sons, Ltd., Chichester, UK.

Himke van der Velde, "Control Plane Protocols," LTE—The UMTS Long Term Evolution: From Theory to Practice, Feb. 20, 2009, pp. 51-78, John Wiley & Sons, Ltd., Chichester, UK.

HANDOVER METHOD AND APPARATUS

TECHNICAL FIELD

The present invention relates to a handover, more particularly, to a method and apparatus for executing a handover.

BACKGROUND ART

In general, when executing a handover procedure, a UE (user equipment) reports channel state information including signal strength of a serving base station and signal strength of neighboring base stations to the serving base station through a measurement report message. Upon receiving this message, the serving base station determines whether to hand over the UE, based on the received information, and instructs the UE to perform handover. In this case, the serving base station transmits an RRC (radio resource control) connection reconfiguration message to the UE to instruct the UE to perform handover. Upon receiving a message indicating the handover command, the UE immediately performs handover to cut off its wireless connection with the serving base station and attempt a connection to a target base station. The UE then attempts a random access to the target base station and the target base station transmits a random access response as a response to the random access. Next, the target base station determines that the handover is successful, and may start to transmit downlink data.

However, this handover procedure may have disadvantages such as making it difficult for a UE to send a signal strength report in real time to a base station because the radio link is not in a good state and making it difficult for the base station to send a handover command in real time to the UE. As a result, the handover is more likely to be failed, the interruption time of data transmission to the UE during handover increases, and causes an inevitable decline in communication quality during handover.

Also, to increase radio capacity, high-capacity wireless services are being provided to offer a higher-quality radio environment with abundant available resources to a plurality of UEs by miniaturizing service cells. In these services, unlike a general base station (hereinafter referred to as 'macro base station'), a base station that provides a communication service to UEs existing in a small cell, which is a small communication region such as a office, residence, or building, is referred to as a small base station. Small base stations that serve small cells exist within a macro cell area served by a macro base station.

Under this communication environment, if the UE wants to change cells, it cuts off the connection with the old cell and connects to a new cell to perform handover.

In the way, the UE frequently changes cells under a mobile communication environment with many small cells built therein, handover occurs frequently, and this may lead to a decline in communication quality and significant signaling overhead. Moreover, there is a need to properly establish a method for configuring radio resources for a UE in case small cells are built in a mobile traffic adaptive heterogeneous network which is divided into a control plane and a user plane.

DISCLOSURE

Technical Problem

The present invention has been made in an effort to provide a method and apparatus for a UE to determine timing of a handover.

The present invention has been made in an effort to provide a handover method and apparatus which can reduce the handover failure rate and shorten the interruption time of data transmission to a UE.

The present invention has been made in an effort to provide a handover method and apparatus which can efficiently configure radio resources for a UE, in a network environment where a plurality of small cells coexist.

Technical Solution

According to an aspect of the present invention, there is provided a handover method for a UE (user equipment), the handover method including: the UE receiving a handover command message from a serving base station; the UE performing cell selection to determine the best cell to handover based on the handover command message; the UE transmitting a handover indication message to the serving base station if its determined that the handover is to be performed; and the UE performing handover.

The UE performing cell selection to determine the best cell to handover may include: the UE measuring continuously signal strength of the serving base station and the signal strength of neighboring base stations including a target base station after receiving the handover command message; and determining whether a handover execution event has occurred or not, based on the signal strength of the serving base station and the signal strength of the neighboring base stations, to determine the timing of handover.

In the determining of the timing of handover, if a handover execution event occurs, it is determined that it is time for handover, and the handover execution event occurs if the signal strength of the target base station is greater than the signal strength of the serving base station by a first offset value or more, if the signal strength of the target base station is maintained greater than the signal strength of the serving base station by a second offset value or more during a given time TTE (Time to Execute), if the signal strength of the target base station is greater than the signal strength of the serving base station and the signal strength of the serving base station is less than a predetermined first threshold, and if the signal strength of the target base station is greater than the signal strength of the serving base station and the signal strength of the target base station is greater than a predetermined second threshold, wherein, if at least one of the events occurs, it is determined that it is time for handover.

In the transmitting of a handover indication message, the handover indication message may be transmitted by either a first notification method for issuing a handover notification by using a MAC control element, a second notification method for issuing a handover notification by using an RRC (radio resource control) message, or a third notification method for issuing a handover notification by using a PHY (physical) channel.

In the first notification method, an LCID (logical channel identifier) indicating a handover indication message may be defined and used, and the cell ID of a target base station for the handover may be included in the message, and in the second notification method, the cell ID of a target base station for the handover may be included in the RRC message.

In the transmitting of a handover indication message, the handover indication message may be repeatedly transmitted.

The handover method may further include the UE receiving a response message for the handover indication message from the serving base station after transmitting the handover indication message.

In the UE performing of handover, if an ACK (acknowledgment) response message indicating the successful reception of the handover indication message is received from the serving base station, handover may be performed.

In the transmitting of a handover indication message, the handover indication message may be repeatedly transmitted until the reception of the ACK response message.

The handover method may further include the serving base station transmitting the response message to the UE, and the serving base station may transmit the response message to the UE by using either a method for transmitting an ACK response message or NACK (Negative ACK) response message through a PHICH (Physical Hybrid ARQ Indicator Channel) channel or a method for transmitting an ACK response message or NACK response message through RLC (radio link control).

The UE performing cell selection to determine the best cell to handover may further include determining the target base station to which the UE will perform handover. In the transmitting of a handover indication message, the UE may include and transmit the determined cell ID of the target base station in the handover indication message.

The handover method may further include, prior to the receiving of a handover command message from the serving base station, if a handover preparation event occurs, the UE transmitting to the serving base station a measurement report message including the signal strength of the serving base station and the signal strength of the neighboring base stations. The handover preparation event may occur if the signal strength of a neighboring base station is greater than the signal strength of the serving base station by the second offset value or more.

The handover command message may be an RRC connection reconfiguration message for configuring one of the neighboring base stations as a target base station, and in the receiving of a handover command message, the UE may receive one or more handover command messages each containing the cell ID of a different target base station, while in the UE performing cell selection to determine the best cell to handover, the UE may determine the timing of reconfiguring a wireless connection to the target base station and select one of the neighboring base stations as the target base station.

In the UE performing of handover, if information indicating whether the UE has to perform a RACH (random access channel) procedure is contained in the handover command message, the RACH procedure may be performed on the target base station.

According to another aspect of the present invention, there is provided a handover method including: a serving base station receiving a measurement report message from a UE containing the signal strength of the serving base station and the signal strength of neighboring base stations; the serving base station transmitting a handover command message to the UE after receiving the measurement report message; receiving a handover indication message from the UE indicating that the UE will perform handover; and forwarding data to be transmitted to the UE to a target base station after receiving the handover indication message.

In the transmitting of a handover command message to the UE, the UE may include and transmit information indicating whether to perform a RACH (random access channel) procedure or not in the handover command message after performing handover.

The handover method may further include: if the handover indication message is not received, receiving a data forwarding request from the target base station; and forwarding data to be transmitted to the UE to the target base station in response to the data forwarding request.

The handover method may further include the serving base station forwarding the handover indication message to the target base station after receiving the handover indication message.

According to yet another aspect of the present invention, there is provided a handover method for a UE in a network where small cells and a macro cell coexist, the handover method including: the UE receiving a cell change command message from a serving base station corresponding to a currently connected cell, the cell change command message containing at least either one of information about the old cell from which the UE will move or information about a new cell to which the UE will move; the UE determining whether to perform cell change or not after receiving the cell change command message; and when performing cell change, the UE performing a change from the currently connected old cell to the new cell based on the information contained in the cell change command message.

The performing of change may include: when performing cell change, if the cell change command message contains both the information about the old cell and the information about the new cell, the UE cutting off the connection with the old cell and connecting to the new cell; and when performing cell change, if the cell change command message contains only the information about the new cell, the UE connecting to the new cell.

The cell change command message may include a first field (Cell add) containing information about the new cell to which the UE will move and a second field (Cell release) containing information about the old cell from which the UE will move.

The handover method may further include, prior to the performing of a change to the new cell, if it is determined that the cell change is to be performed, the UEs transmitting a cell change indication message to the serving base station.

The determining of whether to perform cell change or not may include: the UE measuring the signal strength of the serving base station and the signal strength of neighboring cells; and the UE determining whether a cell change execution event has occurred or not, based on the signal strength of the serving base station and the signal strength of the neighboring cells, to determine the timing of cell change.

Herein, the cell change execution event occurs if the signal strength of the neighboring cells is greater than the signal strength of the serving base station by a first offset value or more, if the signal strength of the neighboring cells is kept to be greater than the signal strength of the serving base station by a second offset value or more during a given time TTE (Time to Execute), if the signal strength of the neighboring cells is greater than the signal strength of the serving base station and the signal strength of the serving base station is less than a predetermined first threshold, and if the signal strength of the neighboring cells is greater than the signal strength of the serving base station and the signal strength of the neighboring cells is greater than a predetermined second threshold, and if at least one of the events occurs, it is determined that it is time for handover.

The handover method may further include, in the determining of the timing for cell change, if the signal strength of the neighboring cells is greater than the first threshold, it is determined that a cell add preparation event has occurred, which is the timing for cell change.

The handover method may further include, if the serving base station is a base station corresponding to a macro cell and the old cell to which the UE is connected and the new cell to which the UE will move are small cells included in the macro cell, the UE transmitting a cell change complete message to the target base station after completion of the cell change.

According to a further aspect of the present invention, there is provided a handover method for a UE in a network environment where small cells and a macro cell coexist, the method including: a serving base station receiving a measurement report message containing signal strength of the serving base station and signal strength of neighboring cells from the UE, the serving base station corresponding to a cell to which the UE is currently connected; the serving base station transmitting a cell change command message to the UE after receiving the measurement report message, the cell change command message including a first field (Cell add) containing information about a new cell to which the UE will move and a second field (Cell release) containing information about the old cell from which the UE will move; and receiving a cell change indication message from the UE indicating that the UE will perform cell change.

The handover method may further include, if the serving base station is a base station corresponding to a macro cell and the old cell to which the UE is connected and the new cell to which the UE will move are small cells included in the macro cell, the serving base station receiving a cell change complete message from the UE.

According to a further aspect of the present invention, there is provided a handover apparatus including: a signal strength measurement unit that receives signals sent from a serving base station and neighboring base stations including a target base station and that measures the strength of the received signals; a measurement report unit that transmits a measurement report message containing channel state information based on the signal strength measurements made by the signal strength measurement unit to the serving base station; a handover command reception unit that receives an RRC (radio resource control) connection reconfiguration message for configuring a neighboring base station as the target base station and backups that message for handover timing determination; a handover timing determination unit that determines and selects the target base station the timing of reconfiguring a connection to the target base station; a handover notification unit that generates a handover indication message indicating that the timing of reconfiguring a connection to the target base station is determined and the target base station is selected, and transmits the same to the serving base station; and a handover execution unit that reconfigures a connection to the target base station.

The handover timing determination unit may determine that it is time for handover if at least one of first through fourth events occurs, the first through fourth events including the first event that occurs when the signal strength of a neighboring base station is greater than the signal strength of the serving base station by a first offset value or more, the second event that occurs when the signal strength of the neighboring base station has been greater than the signal strength of the serving base station by a second offset value or more, the third event that occurs when the signal strength of the neighboring base station is greater than the signal strength of the serving base station and the signal strength of the serving base station is less than a predetermined first threshold, and the fourth event that occurs when the signal strength of the neighboring base station is greater than the signal strength of the serving base station and the signal strength of the neighboring base station is greater than a predetermined second threshold.

If the serving base station is a base station corresponding to a macro cell and the old cell to which the UE is connected and the new cell to which the UE will move are small cells included in the macro cell, the RRC connection reconfiguration message may be a cell change command message including a first field (Cell add) containing information about a new cell to which the UE will move and a second field (Cell release) containing information about the old cell from which the UE will move.

If the serving base station is a base station corresponding to a macro cell and the signal strength of the neighboring base station is greater than the first threshold, the handover timing determination unit may determine that a cell add preparation event has occurred, which is the timing for cell change. A cell add event may indicate making an additional connection while one of the plurality of small cells included in the macro cell serves as the serving cell when the UE is connected to the macro cell which is the primary cell.

Advantageous Effects

According to an embodiment of the present invention, since a UE determines the timing of handover, handover is performed based on base station signal strength measurement results acquired in real time from the UE. As a result, the success rate of handover is improved, and data interruption time during handover is significantly shortened. Additionally, the timing of handover can be synchronized between a UE and base stations in most cases.

Moreover, when the UE changes its connected cell in a communication environment where small cells are built, the UE may perform cell change, rather than handover, in order to minimize handover delay time and data loss during handover.

Furthermore, because the UE can connect to and communicate with two cells simultaneously according to a radio resource configuration, soft handover can be easily achieved in an OFDM-based mobile communication system, and communication quality reduction at cell boundaries can be alleviated through cooperative transmission between base stations.

Furthermore, since the UE can configure radio resources through a macro base station and additionally configure small cells and radio resources if small cells are found, small cells are built in a mobile traffic adaptive heterogeneous network which is divided into a control plane and a user plane, in order to save energy of a mobile communication system.

Furthermore, the macro base station is able to conduct integrated radio resources management for a Wi-Fi AP (access point) or mmWave (millimeter wave) cell, and if, as a result, the Wi-Fi AP or mmWave cell is configured to operate similarly to small cells, radio resources for the UE can be configured in the same manner as when small cells are built, thereby making more efficient use of radio resources.

Furthermore, the UE can configure two different macro base stations and radio resources and send or receive data to or from the two base stations simultaneously, and as a result, soft handover can be easily achieved in an OFDM-based mobile communication system and therefore data loss can be minimized during handover.

MODE FOR INVENTION

Figure 1:
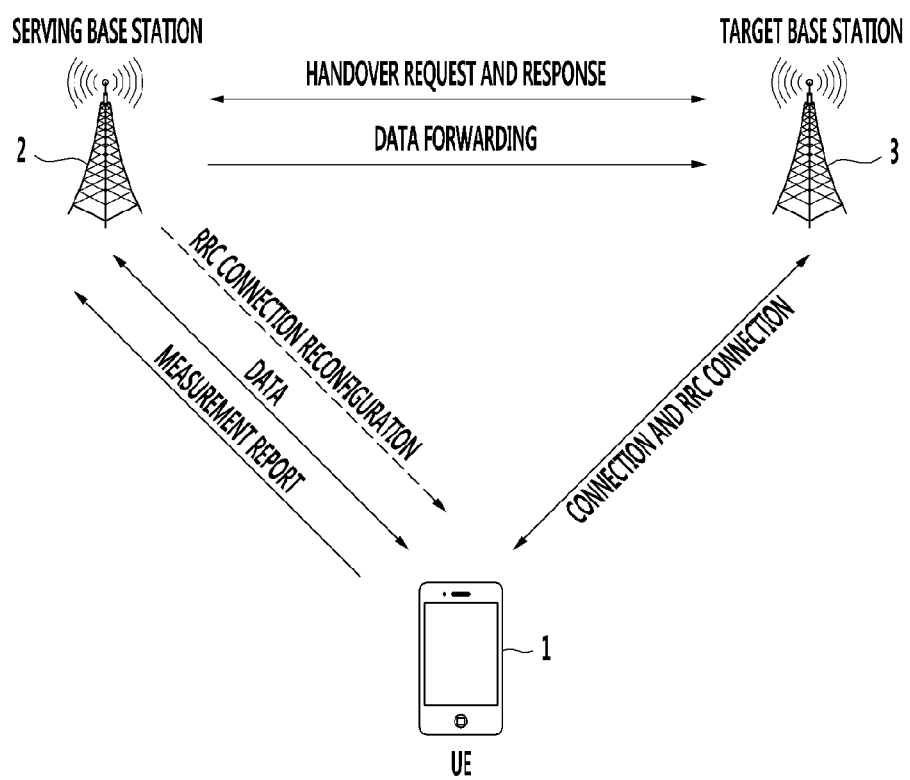
FIG. 1 is a view showing a network environment where handover is performed according to a first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

Throughout this specification and the claims which follow, unless explicitly described to the contrary, the word "comprise" and variations such as "comprises" or "comprising" will be understood to imply the inclusion of stated elements but not the exclusion of any other elements.

In this specification, a terminal may designate a mobile terminal (MT), a mobile station (MS), an advanced mobile station (AMS), a high reliability mobile station (HR-MS), a subscriber station (SS), a portable subscriber station (PSS), an access terminal (AT), user equipment (UE), etc., and may include the entire or partial functions of the MT, the MS, the AMS, the HR-MS, the SS, the PSS, the AT, the UE, etc.

A base station (BS) may designate an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (HR-RS) serving as a base station, a high reliability relay station (HR-RS) serving as a base station, a small base station (femto BS, home node B (HNB), home eNodeB (HeNB), pico BS, metro BS, micro BS, etc), etc and may include all or some functions of the ABS, nodeB, eNodeB, AP, RAS, BTS, MMR-BS, RS, RN, ARS, HR-RS, small base station, etc.

Hereinafter, a handover method and apparatus according to an exemplary embodiment of the present invention will be described.

FIG. 1 is a view showing a network environment where handover is performed according to a first exemplary embodiment of the present invention.

As shown in the attached FIG. 1, in a network environment where a plurality of small cells coexist, a terminal that is, UE 1 makes a connection to a given cell via a base station which is in charge of the cells. The UE 1 may perform a handover from the serving base station 2 of a current connected cell to a target base station 3 while it is moving.

In such a radio channel environment, conventionally, when the UE measures the strength of signals received from a serving base station and neighboring base stations and transmits channel state information of a serving cell and neighboring cells to the serving base station through a measurement report message, the serving base station determines if the UE requires handover and transmits a handover command message to the UE. Afterwards, the UE immediately performs handover to cut off its wireless connection with the serving base station and attempts a connection to a target base station. As the UE performs random access to the target base station, the target base station sends a random access response to the UE, and then the target base station determines that the handover is successful and may start to transmit downlink data.

The UE is not able to receive data during a handover interruption time, which starts from the time at which the UE cuts off the wireless connection with the serving base station, and attempts a connection to the target base station and ends at the initial reception of downlink data following the success of a RACH (random access channel) procedure for the target base station. The handover interruption time for which the UE cannot receive data during handover is defined as around 10.5 ms according to the standards.

In reality, however, downlink data transmission stops at the timing when the serving base station transmits a handover command message to the UE. Therefore, the handover interruption time is much longer than that defined in the standards. However, real-time transmission of the UE signal strength report to the base station and transmission of the handover command from the base station to the UE may not be possible due to a bad radio link state in a handover region. Hence, it is highly likely that the UE will not perform handover as a real-time response to the radio link state or the handover itself will fail. Consequently, data interruption time during handover will be further lengthened, or communication quality will inevitably decline during handover due to data interruption time in a recovery procedure following a handover failure.

Accordingly, according to the exemplary embodiment of the present invention, the UE makes a final determination about the handover timing so as to perform handover in real time depending on the radio link state and increases the success rate of handover.

Figure 2:
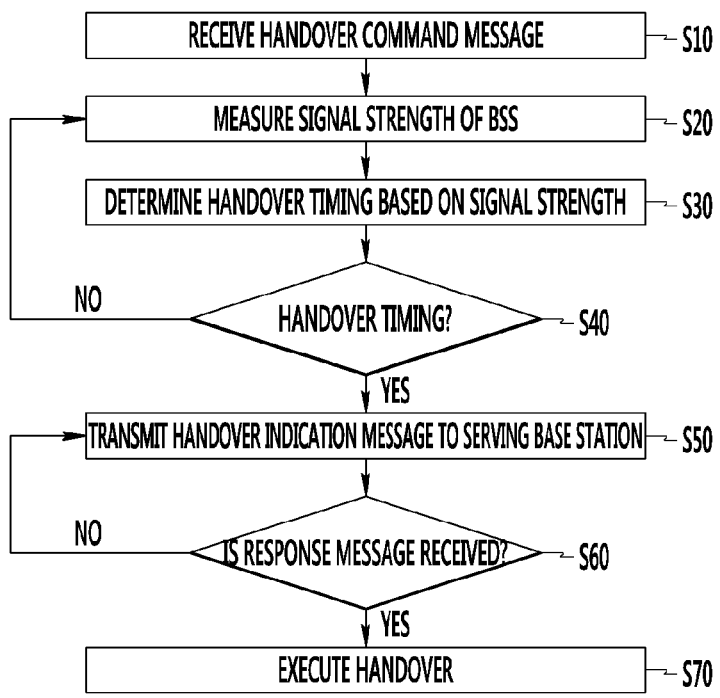
FIG. 2 is a flowchart of a handover method according to the first exemplary embodiment of the present invention.

FIG. 2 is a flowchart of a handover method according to the first exemplary embodiment of the present invention.

According to the exemplary embodiment of the present invention, the UE does not perform handover immediately after receiving a message indicating a handover command from the serving base station, but performs handover at an appropriate time for handover that the UE has determined.

As shown in FIG. 2, upon receiving a handover command message from the serving base station 2 (S10), the UE 1 measures the signal strength of the serving base station 2 and the signal strength of neighboring stations, and determines the timing of handover based on the signal strength (S20 and S30). A process of determining if the UE requires handover will be described later in more detail.

If the current state of the UE 1 indicates that it has to perform handover (S40), the UE 1 generates a handover indication message and transmits it to the serving base station 2 (S50). The UE 1 may issue a handover notification by the following methods.

First, the UE 1 issues a handover notification by using a MAC control element. An LCID (logical channel identifier) indicating a handover indication message may be defined and used, and the cell ID of a target base station for the handover may be included in the message (first notification method).

Second, the UE 1 issues a handover notification by using an RRC message. The RRC message may include the cell ID of a target base station for the handover (second notification method).

The UE 1 may issue a handover notification to the serving base station 2 based on the above three notification methods. In this case, one of these methods is preferably used in numerical order (first notification method>second notification method).

When issuing a handover notification to the serving base station 2, the UE 1 may repeatedly transmit a handover indication message to attain the reliability of the transmitted message.

As shown in FIG. 2, the UE 1 transmits a handover indication message to the serving base station 2 and then performs handover. At this time, the UE 1 may perform handover immediately after transmitting the handover indication message to the serving base station 2 or after receiving a response message (ACK) from the serving base station 2 indicating the successful reception of the handover indication message.

The serving base station 2 may transmit a response message about whether the handover indication message is received or not to the UE 1. For example, an ACK (ACKnowledgment) response message indicating that the handover indication message is properly received is transmitted to the UE 1, or a NACK (Negative ACKnowledgment) response message indicating that the handover indication message is not properly received is transmitted to the UE 1. If the MAC control element is used to transmit a response message, ACK or NACK may be transmitted via a PHICH (Physical Hybrid ARQ Indicator Channel). Also, the response message may be set using an RRC message. In this case, ACK/NACK may be transmitted via PHICH or via RLC (radio link control).

For example, as shown in FIG. 2, upon receiving a response message about the handover indication message transmitted from the serving base station 2 (S60), the UE 1 performs a handover to the target base station 3 (S70).

Meanwhile, if the UE 1 has failed to transmit the handover indication message from the serving base station 2, or has received no response message (ACK) from the serving base station 2 after transmitting the handover indication message, the UE 1 can perform a handover to the target base station 3, and the target base station 3 can request the serving base station 2 to forward data to be transmitted to the UE 1. In this case, the serving base station 2 forwards the data to be transmitted to the UE 1 to the target base station 3 in response to the request from the target base station 3.

Next, a process for a UE to determine the timing of handover in the handover method according to the exemplary embodiment of the present invention will be described in detail.

Figure 3:
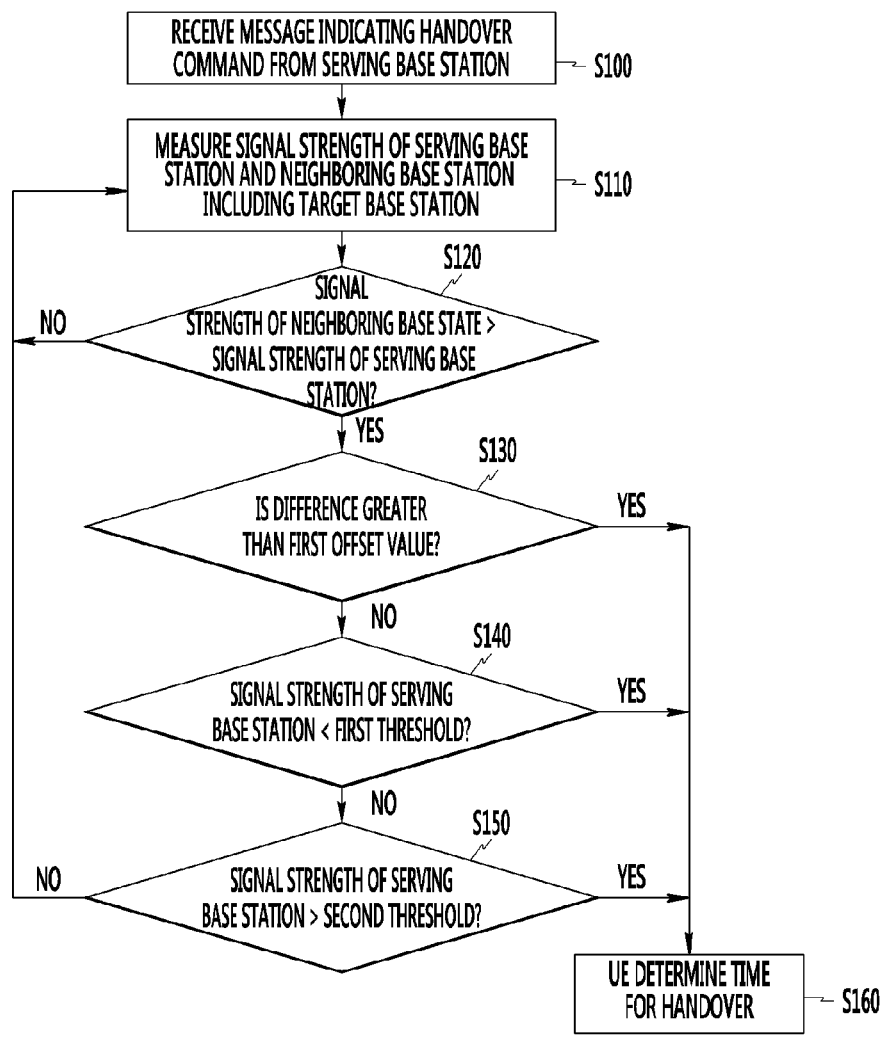
FIG. 3 is a flowchart of a process for determining whether to hand over a UE in the handover method according to the first exemplary embodiment of the present invention.

FIG. 3 is a flowchart of a process for determining whether to hand over a UE in the handover method according to the first exemplary embodiment of the present invention.

The UE 1 does not perform handover immediately after receiving a handover command message from the serving base station 2, but instead backups the received handover command message and determines the appropriate timing for handover. The UE 1 measures the signal strength of the serving base station 2 and the signal strength of neighboring base stations including the target base station 3, and compares the signal strength measurements (S100 and S110). Here, the signal strength of neighboring base stations including the target base station is compared with the signal strength of the serving base station to determine whether a handover execution event has occurred or not.

Figure 4:
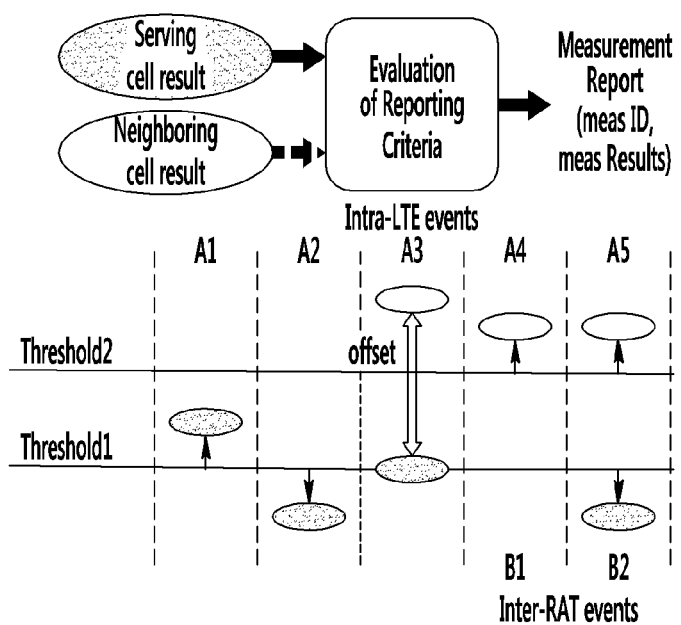
FIG. 4 is an illustration of event occurrence based on signal strength in the handover method according to the first exemplary embodiment of the present invention.

FIG. 4 is an illustration of event occurrence based on signal strength in the handover method according to the first exemplary embodiment of the present invention.

As a comparison result, if the signal strength of a neighboring base station is greater than the signal strength of the serving base station (S120), the UE 1 determines that a handover execution event has occurred and it is time for handover as long as the signal strength of the neighboring base station is greater than the signal strength of the serving base station by a first offset value (e.g., 6 dB) or more (S130 and S160). In the exemplary embodiment of the present invention, a handover execution event indicates that it is more desirable for the UE to perform a handover to the target base station than to maintain a wireless connection with the serving base station.

Moreover, if the signal strength of the neighboring base station is kept to be greater than the signal strength of the serving base station by a second offset value or more during a given time (e.g., TTE (Time to Execute)), the UE 1 determines that it is time for handover. Further, if the signal strength of the neighboring base station is greater than the signal strength of the serving base station and the signal strength of the serving base station is less than a predetermined first threshold (Threshold 1) (A2 of FIG. 4), the UE 1 determines that a handover execution event has occurred and it is time for handover (S140 and S160).

In addition, if the signal strength of the neighboring base station is greater than the signal strength of the serving base station and the signal strength of the serving base station is greater than a predetermined second threshold (Threshold 2) (A4 of FIG. 4), the UE 1 determines that a handover execution event has occurred and it is time for handover (S150 and S160). A handover execution event according to an exemplary embodiment of the present invention is not limited to those described above.

While the UE determines the timing for handover in the above-described handover method, the UE 1 also may determine the target base station to which handover is to be performed. That is, the UE 1 may determine the target base station based on the signal strength measurements of the neighboring base stations. For example, a neighboring base station having greater signal strength than the serving base station by the first offset value or more may be selected as the target base station to which handover is to be performed, from among the neighboring base stations having a greater signal strength than the serving base station. The UE 1 may receive one or more handover command messages. In this case, the target base station for each handover command message is different. At this time, the UE 1 backups each handover command message and may determine the optimal target base station to which handover is to be performed, while determining the optimal timing for handover.

Figure 5:
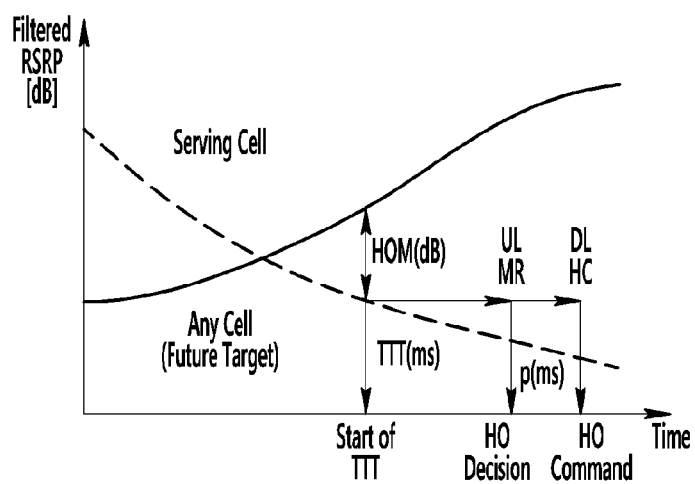
FIG. 5 is a graph showing RSRP (reference signal received power) characteristics according to a conventional handover method.
Figure 6:
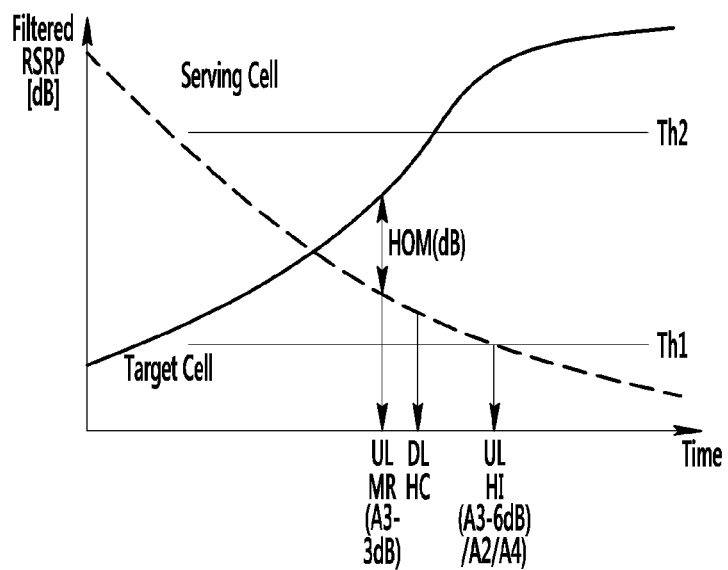
FIG. 6 is a graph showing RSRP characteristics according to the handover method of the first exemplary embodiment of the present invention.

FIG. 5 is a graph showing RSRP (reference signal received power) characteristics according to a conventional handover method, and FIG. 6 is a graph showing RSRP characteristics according to the handover method of the first exemplary embodiment of the present invention.

In the conventional handover method, if the difference in signal strength between the serving base station and the target base station is an HOM (Handover Margin) (ex. 2 dB) or more, the TTT (Time to Trigger) timer is started. If the signal strength of the target base station is maintained to be greater than the serving base station by the HOM or more during the TTT, the UE transmits a measurement report message to the serving base station. Based on the measurement report message, the serving base station determines the target base station to hand over the UE and prepares for handover. The target base station generates a handover command message containing radio resource configuration information that the UE will use after handover, and transmits it to the serving base station. The serving base station sends the handover command message transmitted from the target base station to the UE. Having received the handover command message, the UE cuts off the wireless connection with the serving base station and performs a handover to the target base station.

In the handover method according to the exemplary embodiment of the present invention, if the difference in signal strength between the serving base station and the target base station is an HOM (Handover Margin) (ex. 2 dB) or more, the UE immediately transmits a measurement report message to the serving base station. Based on the measurement report message, the serving base station determines the target base station to hand over the UE and prepares for handover. The target base station generates a handover command message containing radio resource configuration information that the UE will use after handover, and transmits it to the serving base station. The serving base station sends the handover command message transmitted from the target base station to the UE. The UE 1 may receive one or more handover command messages. In this case, each handover command message is received from a different target base station. Having received the handover command message, the UE does not immediately perform handover, but instead backups the received handover command message and continuously compares the signal strength of the serving base station and the signal strength of the target base station and selects the best target base station at the best timing for handover to perform a handover to the target base station.

Next, the application of the above-described handover method according to the first exemplary embodiment of the present invention to a substantial wireless environment will be described in more detail.

Figure 7:
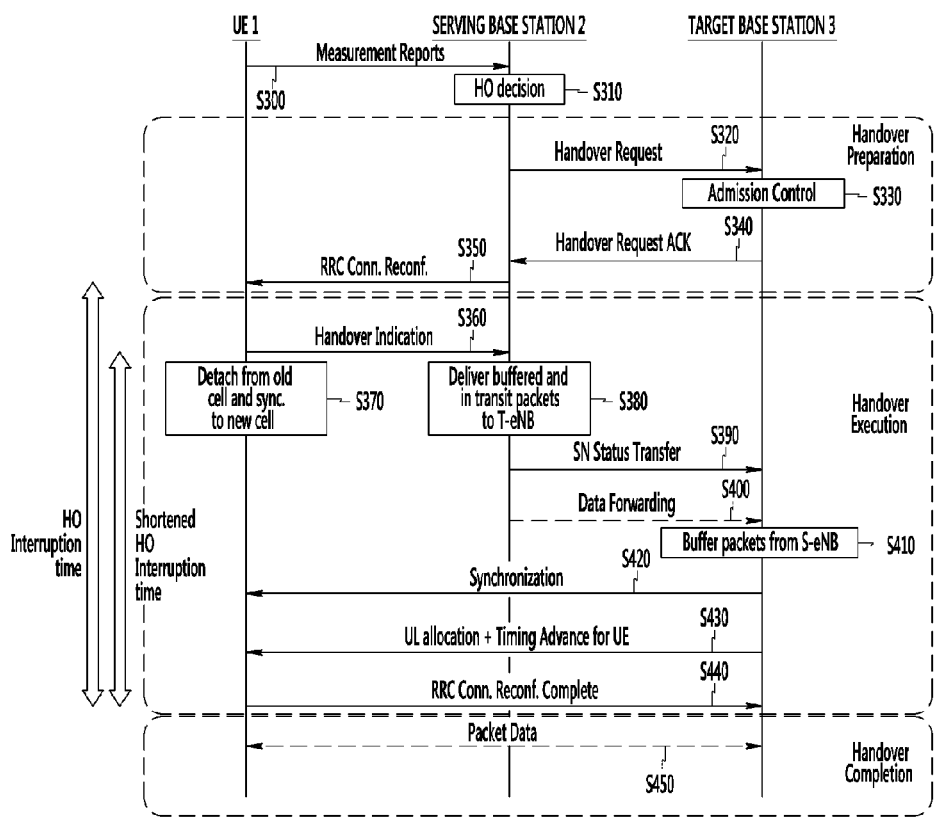
FIG. 7 is a timing diagram of the handover method according to the first exemplary embodiment of the present invention.

FIG. 7 is a handover timing diagram showing when the handover method according to the first exemplary embodiment of the present invention is substantially applied to a wireless environment.

As shown in the attached FIG. 7, the UE 1 measures the strength of signals received from the serving base station 2 and neighboring base stations, and transmits to the serving base station 2 a measurement report message containing channel state information based on the signal strength (S300). The UE transmits a measurement report message when a handover preparation event occurs. For example, if a handover preparation event occurs in which the measured signal strength of a neighboring base station is greater than the signal strength of the serving base station by a second offset value (e.g., 2 dB) or more, the UE 1 may transmit a measurement report message containing channel state information to the serving base station 2. A handover preparation event according to an exemplary embodiment of the present invention is not limited to those described above. The second offset value used to determine whether a handover preparation event has occurred and the second offset value used to determine whether a handover execution event has occurred may be the same or different.

The serving base station 2 determines whether to perform handover or not based on the channel state information contained in the received measurement report message, and determines the target base station to which handover is to be performed (S310). The serving base station 2 transmits a handover request message to the target base station 3 (S320). The handover request message may contain information including the context of the UE. The target base station determines whether to accept handover based on the context information of the UE (S330), and if it accepts handover, transmits a handover request (ACK) message containing information required to connect to the target base station to the serving base station 2 (S340).

As the target base station 3 accepts handover, the serving base station 2 transmits a handover command message, i.e., an RRC connection reconfiguration (RRC Conn.Reconf) message for configuring a neighboring base station as a target base station to the UE 1 (S350). At this time, information indicating whether the UE has to perform a RACH procedure after handover may be contained and transmitted in the RRC connection configuration message.

The UE 1 receives the RRC connection reconfiguration message, and determines to select the best target base station at the best time for handover and perform handover, rather than performing handover immediately after receiving the message.

If the UE 1 determines to perform handover after receiving the RRC connection reconfiguration message, it transmits a handover indication message to the serving base station 2 to issue a handover notification (S360).

Afterwards, the UE 1 performs a handover to the target base station 3 (S370). At this time, the serving base station 2 can forward to the target base station 3 the sequence number of a PDCP (packet data convergence protocol) SDU (service data unit) being retransmitted, packets in a buffer, and packets received from a gateway. Such a process can be optionally performed (S380-S410).

The UE 1 terminal 1 attempts a random access to the target base station, and receives uplink resource allocation and timing reallocation information from the target base station 3 as a response to the random access attempt.

Then, the UE 1 transmits to the target base station 3 an RRC connection reconfiguration complete message (RRC Conn.Reconf.Complete) (S420-S440). Thereafter, downlink data is transmitted from the target base station 3 to the UE 1 (S450).

Meanwhile, the serving base station 2 does not forward data to be transmitted to the UE 1 to the target base station 3 immediately after sending a message indicating a handover command, i.e., an RRC connection configuration message, to the UE 1, but can forward the data to the target base station 3 if it receives a handover indication message from the UE 1 as described above. If necessary, the serving base station 2 may transmit a handover indication message to the target base station 3 indicating that the UE will perform handover. Accordingly, the target base station 3 may start the transmission of downlink data at the accurate time of the UE handover without the UE performing a RACH procedure.

When transmitting a handover command message (RRC connection reconfiguration message), information indicating whether the UE 1 needs to perform the RACH procedure after the handover to the target base station 3 may be contained in the message to notify the UE 1. In this case, the UE 1 may perform the RACH procedure for the target base station 3 or not after the handover to the target base station 3, based on the information contained in the received message to indicate whether the RACH procedure is needed or not.

A handover interruption time exists in which the UE cannot receive data during the handover. The handover interruption time starts from the time at which the serving base station receives a handover indication message when the UE cuts off the wireless connection with the serving base station and ends at the UE initial reception of downlink data from the target base station. As such, the handover interruption time is significantly shorter than the conventional handover interruption time, which starts from the time at which the serving base station transmits an RRC connection reconfiguration message to the UE.

Also, when the UE performs handover within a single DU of a cloud base station environment consisting of DUs (data units) or RUs (radio units) based on the above handover method, downlink data can be transmitted at the timing of handover without performing a RACH procedure for the target base station after the handover, thereby eliminating data interrupt time during the handover. Even for a different DU, when the serving base station notifies the target base station of the timing of the UE handover, downlink data can be likewise transmitted at the time of handover without performing a RACH procedure for the target base station after the handover, thereby eliminating data interruption time during the handover.

Figure 8:
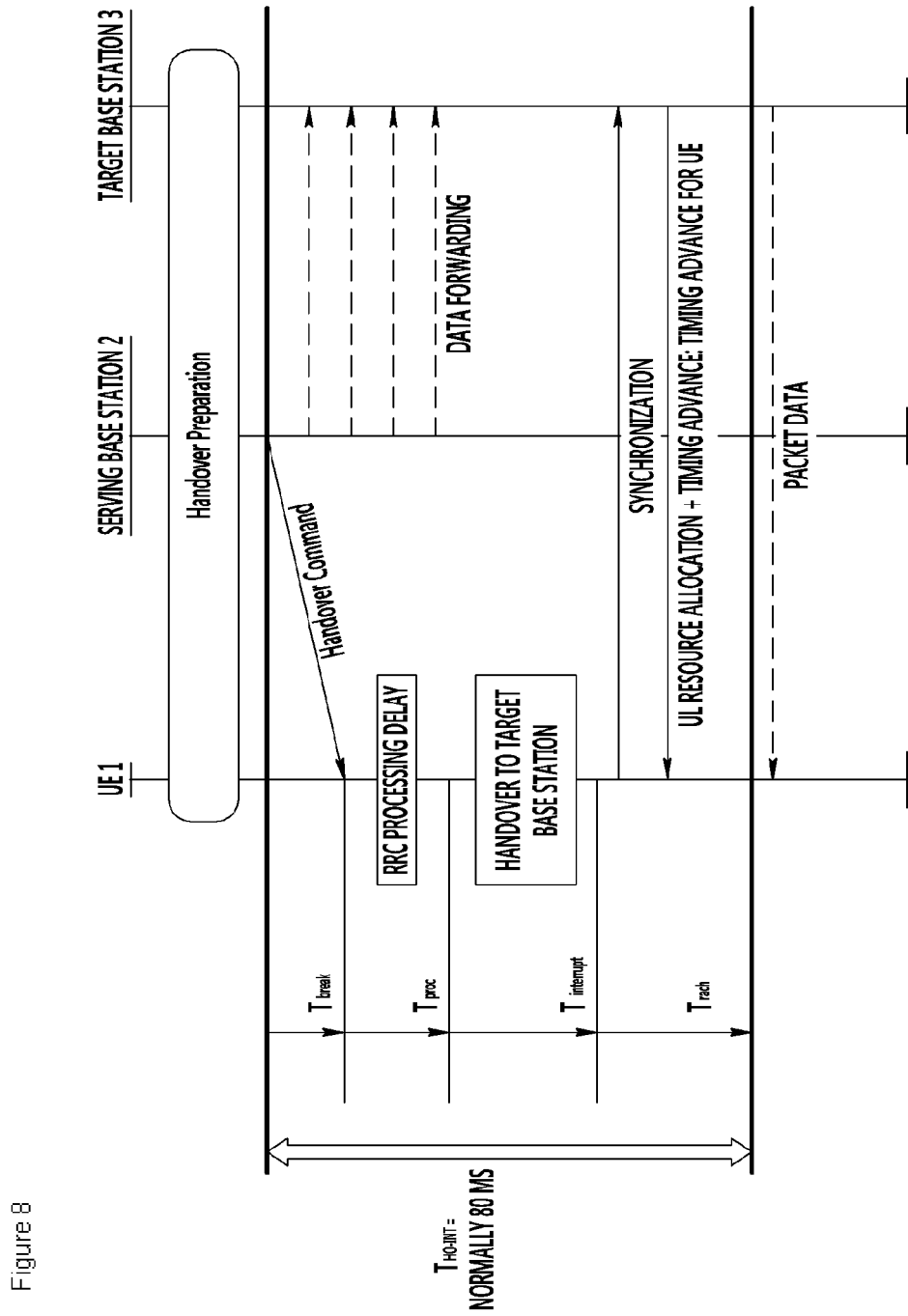
FIG. 8 is a view showing handover interrupt time according to the conventional handover method.
Figure 9:
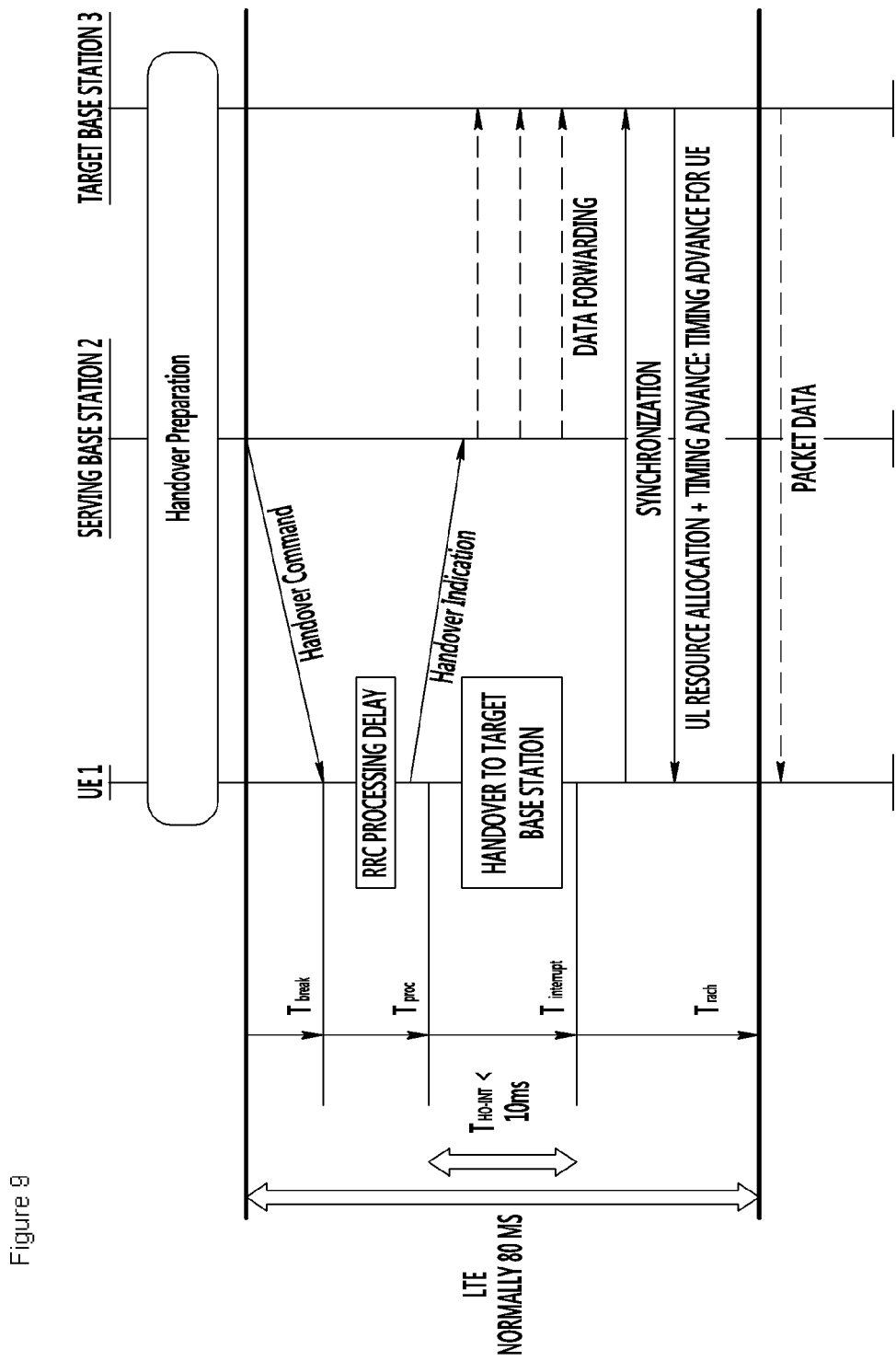
FIG. 9 is a view showing handover interrupt time according to the handover method of the first exemplary embodiment of the present invention.

FIG. 8 is a view showing handover interruption time according to the conventional handover method, and FIG. 9 is a view showing handover interruption time according to the handover method of the first exemplary embodiment of the present invention.

As shown in the attached FIG. 8, conventionally, the serving base station 12 sends a handover command message to the UE 1 in a handover preparation step and then forwards data to the target base station 3, and the UE 1 receives the handover command message and connects to the target base station 3 while performing handover. Afterwards, as an RRC connection with the target base station 3 is completed and synchronization is achieved, resources are allocated to the UE 1, and then downlink data can be transmitted from the target base station 3 to the UE 1. Accordingly, the actual time ($T_{HO\text{-}INT}$) of interruption of data to the UE 1 during handover is equal to the time ($T_{break}+T_{proc}+T_{interrupt}+T_{rach}$), which starts from the time the serving base station transmits a handover command message and ends at the completion of connection to the target base station and radio resource allocation.

However, according to the exemplary embodiment of the present invention, as shown in FIG. 9, the serving base station 12 transmits a handover command message to the UE 1 in the handover preparation step, and then determines the timing at which the UE 1 performs handover. Upon receiving a handover indication message from the UE 1, the serving base station 12 starts to forward data to the target base station 3. While the UE 1 performs handover, it connects to the target base station 3. As an RRC connection to the target base station 3 is completed and synchronization is achieved, resources are allocated to the UE 1, and then the downlink data can be transmitted from the target base station 3 to the UE 1. Accordingly, the actual time ($T_{HO\text{-}INT}$) of interruption of data to the UE 1 during handover is equal to the time ($T_{interrupt}$), which starts from the time the serving base station receives a handover indication message from the UE 1 and starts to forward data to the target base station and ends at the completion of connection to the target base station and radio resource allocation. Therefore, it is concluded that the handover interruption time has significantly shortened according to the handover method of the exemplary embodiment of the present invention.

Next, a handover method and apparatus according to a second exemplary embodiment of the present invention will be described.

In the second exemplary embodiment of the present invention, in a network environment where small cells and a macro cell coexist, when a UE is connected to the macro cell corresponding to a primary cell and the small cells in the macro cell, or connected to the primary cell alone, it performs handover according to a radio resource configuration based on cell add or cell release. In the second exemplary embodiment, cell change includes the above-mentioned handover based on a radio resource configuration.

Figure 10:
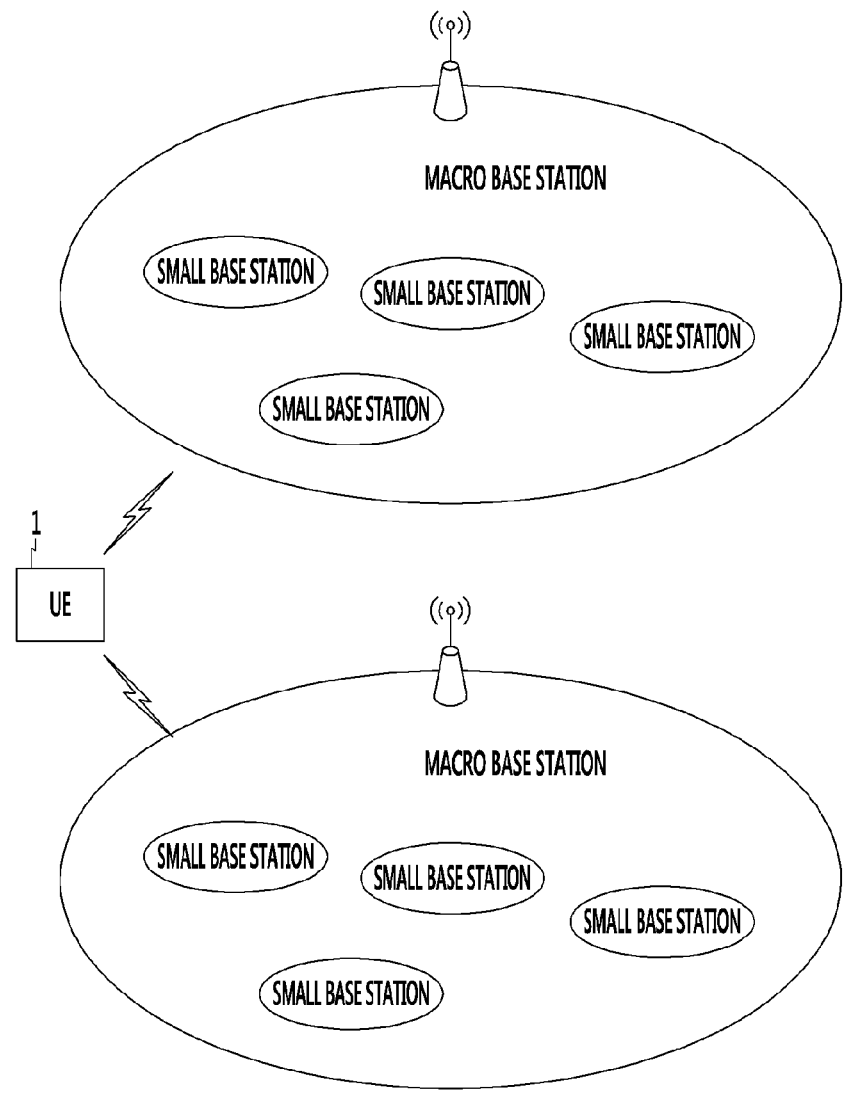
FIG. 10 is a view showing a network environment according to a second exemplary embodiment of the present invention.

FIG. 10 is a view showing a network environment according to a second exemplary embodiment of the present invention.

As shown in the attached FIG. 10, in a network environment where small cells and a macro cell coexist, a macro base station in the macro cell communicates with small base stations located at a plurality of small cells present in the macro cell, and performs radio resource control on a UE 1.

In such a network environment, carrier aggregation (CA) is supported using a plurality of carriers. Specifically, the macro base station may consist of a plurality of component carriers (CC), and each component carrier may operate as a single cell in the same base station. The base stations of the small cells in the macro base station may use different component carriers. All the component carriers constituting the base station the UE is currently connected to may be configured for the UE. In this case, the UE controls the activation or deactivation of some or all of the component carriers, and selects one of the activated component carriers as a primary carrier and the other activated carriers as secondary carriers.

In such a network environment, the UE 1 can change its connection from the currently connected cell to another cell, and the UE 1 may configure radio resources using different frequency resources or different antenna resources so as to simultaneously connect to two cells and communicate with them. In the second exemplary embodiment of the present invention, the UE 1 performs handover based on a radio resource configuration, and determines the timing of cell change according to the radio resource configuration and finally determines which cells to change.

A handover method in which a UE changes the connected cell when the same base station performs radio resource control on the UE will now be described.

Figure 11:
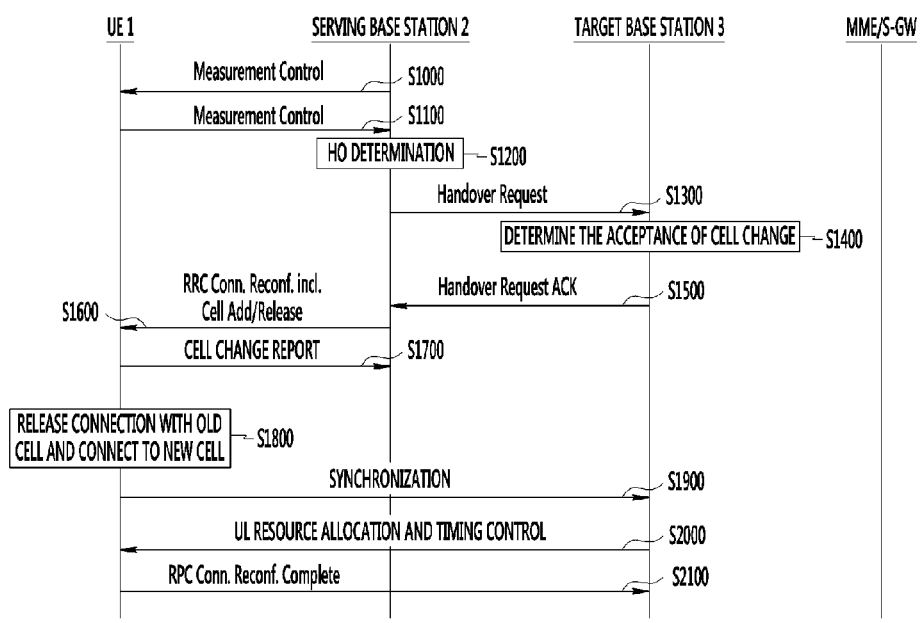
FIG. 11 is a flowchart of the handover method according to the second exemplary embodiment of the present invention.

FIG. 11 is a flowchart of the handover method according to the second exemplary embodiment of the present invention.

In the second exemplary embodiment of the present invention, a UE can change the connected cell to one of the small cells located in the macro cell including a serving base station (also referred to as a primary base station or source base station) that the UE is currently connected to.

As shown in FIG. 11, the serving base station 2 corresponding to the cell the UE 1 is currently connected to transmits a measurement control message to the UE 1 (S1000). Upon receiving the measurement control message, the UE 1 measures the signal strength of neighboring cells. Then, the UE 1 transmits a measurement report message including a measurement result to the serving base station 2 (S1100). The UE 1, as used herein, transmits a measurement report message according to an instruction from the serving base station, while on the other hand, the UE 1 may generate a measurement report message and transmit it to the serving base station periodically or upon occurrence of a predetermined event. For example, if the measured signal strength of a neighboring cell is greater than a predetermined threshold, or if an event occurs in which the signal strength of a neighboring cell is greater than the signal strength of the serving base station by a predetermined value, a measurement report message containing channel state information may be transmitted to the serving base station.

The serving base station 2 determines whether to change the connected cell, based on the channel state information contained in the received measurement report message and obtained from a UE radio channel quality measurement result, and based on radio management regarding radio resources managed by it (S1200).

If it is determined that the UE needs to change the connected cell, the serving base station 2 selects a new cell to which the UE will move, transmits a handover request message to the base station that manages the selected cell, that is, the target base station (also referred to as a secondary base station), so that the target base station 3 configures radio resources for the UE in advance (S1300). Here, the target base station 3 is a small base station corresponding to the new cell to which the UE will move, among the plurality of small cells located in the macro cell including the serving base station 2.

The target base station 3 determines if it can accept the radio resources for the UE (S1400). If so, the target base station 3 transmits a handover request acknowledgment (ACK) message containing information required to connect to the target base station to the serving base station 2 (S1500). The handover request acknowledgment message may include a random access preamble to be used by the UE for the target base station, and an RNTI (radio network temporary identifier).

Upon receiving the handover request acknowledgment message from the target base station 3, the serving base station 2 transmits an RRC connection reconfiguration (RRC Conn.Reconf) message to instruct the UE 1 to connect to the target base station (S1600). The RRC connection reconfiguration message contains information about the new cell to which the UE will move. Specifically, the information about the new cell to which the UE will move is contained in a first field (e.g., Cell Add). Information about the old cell from which the UE will move is contained in a second field (Cell release).

The RRC connection reconfiguration message including the first field (ex: Cell Add) and the second field (ex: Cell release) can be realized as shown in the following Table 1.

Table 1 shows an RRC connection reconfiguration message using SCellToAddMod defined in RRC-related standards.

TABLE 1

```
SCellToAddMod-r10 ::=          SEQUENCE {
    sCellIndex-r10                 SCellIndex-r10,
    cellIdentification-r10         SEQUENCE {
        physCellId-r10                 PhysCellId,
        dl-CarrierFreq-r10             ARFCN-ValueEUTRA
    }                                      OPTIONAL, -- Cond
SCellAdd
    radioResourceConfigCommonSCell-r10    RadioResourceConfigCommonSCell-r10
    OPTIONAL, -- Cond SCellAdd
    radioResourceConfigDedicatedSCell-r10
    RadioResourceConfigDedicatedSCell-r10 OPTIONAL, -- Cond SCellAdd2
    ...
}
```

The UE 1 receives an RRC connection reconfiguration message and releases, and when releasing the connection with the currently connected old cell based on the information contained in the received message, the UE 1 cuts off the connection and connects to a new cell in synchronization with the new cell. The UE 1 selects which cells to change at the best timing for cell change and performs cell change, rather than performing handover, i.e., cell change, immediately after receiving the message. A process for determining the timing of cell change and which cells to change will be described later in detail.

Once the UE 1 determines the timing of cell change and which cells to change after receiving the RRC connection reconfiguration message, it notifies that it will transmit a secondary cell reconfiguration message to the serving base station 2 (S1700). The secondary cell reconfiguration message may contain the ID of a new cell.

Afterwards, the UE 1 cuts off the connection with the old cell and connects to a new cell (S1800).

The UE 1 attempts a random access to the target base station 3 corresponding to the new cell, and receives a timing advance from the target base station 3 as a response to the random access attempt. The UE 1 performs synchronization with the target base station 3 based on the timing advance (S1900 and S2000). Afterwards, the UE 1 transmits an RRC connection reconfiguration complete (RRC Conn.Reconf.Complete) message to the target base station 3 to notify the target base station 3 of the success of the connection to the new cell (S210). If necessary, the serving base station 2 or the target base station 3 may perform data path switching by communicating with an MME (mobility management entity) and an S-GW (serving-gateway). If the data path always passes through the serving base station 2, the path switching procedure can be omitted.

Through this process, the UE is able to change the connected cell when the same base station performs radio resource control. That is, when the UE is connected to the macro base station, the UE is able to switch its connection to the base station of a small cell using a different component carrier within the same macro base station by cell add and cell release based on carrier aggregation.

Unlike the above description, the connected cell may be changed even when a different base station performs radio resource control on the UE.

Next, the operation of the UE in the handover method according to the second exemplary embodiment of the present invention will be described in more detail.

Figure 12:
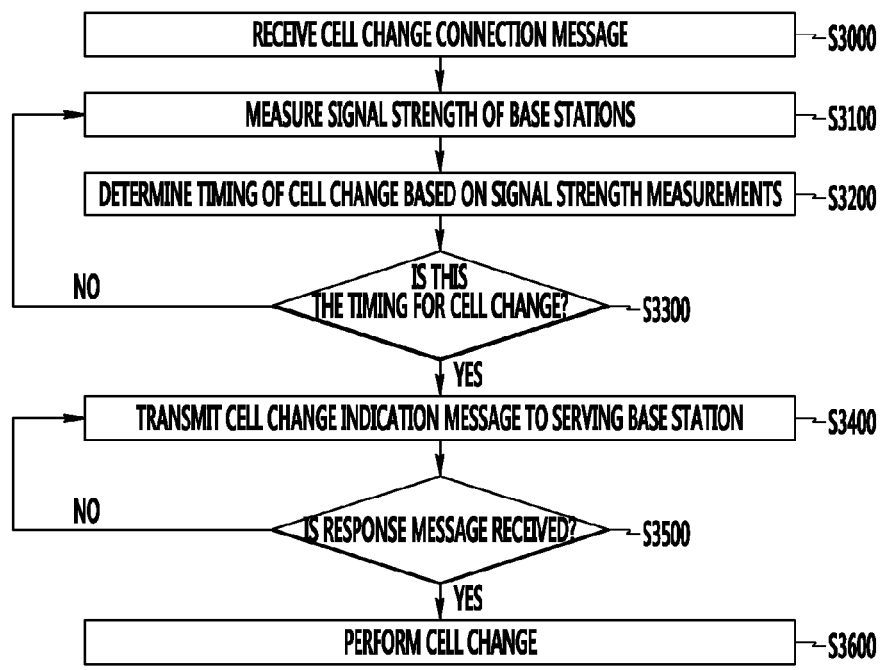
FIG. 12 is a flowchart of the operation of a UE according to the second exemplary embodiment of the present invention.

FIG. 12 is a flowchart of the operation of a UE according to the second exemplary embodiment of the present invention.

In the exemplary embodiment of the present invention, the UE does not change cells immediately after receiving a message instructing to connect to a target base station from a serving base station, but instead change cells at the appropriate timing for cell change that the UE determines.

As shown in FIG. 12, upon receiving an RRC connection reconfiguration message instructing to change cells from the serving base station 2 (S3000), the UE 1 measures the signal strength of the serving base station 2 and the signal strength of neighboring base stations, and determines the timing of handover, i.e., cell change, based on the signal strength measurements (S3100 and S3200). Then, the UE finally determines which cells to change. A process for the UE to determine the timing of cell change will be described later in more detail.

If the current state of the UE 1 indicates that it has to perform cell change (S3300), the UE 1 generates a cell change indication message and transmits it to the serving base station 2 (S3400). As in the foregoing first exemplary embodiment, the UE 1 may issue a cell change notification to the serving base station 2 based on one of the two notification methods. In this case, one of these methods is preferably used in numerical order (first notification method>second notification method). Needless to say, the UE 1 may repeatedly transmit a cell change indication message when issuing a cell change notification to the serving base station 2, in order to attain the reliability of the transmitted message.

As shown in FIG. 12, the UE 1 transmits a cell change indication message to the serving base station 2 and then performs handover, i.e., cell change. At this time, the UE 1 may perform cell change immediately after transmitting the cell change indication message to the serving base station 2 or after receiving a response message (ACK) indicating the successful reception of the cell change indication message from the serving base station 2.

The serving base station 2 may transmit a response message about whether the cell change indication message is received or not to the UE 1. For example, as in the first exemplary embodiment, an ACK response message indicating that the cell change indication message is properly received is transmitted to the UE 1, or a NACK response message indicating that the cell change indication message is not properly received is transmitted to the UE 1.

For example, as shown in FIG. 12, upon receiving a response message about the cell change indication message transmitted from the serving base station 2 (S3500), the UE 1 performs a cell change to the target base station 3 (S3600).

Meanwhile, if the UE 1 has failed to transmit the cell change indication message from the serving base station 2, or has received no response message (ACK) from the serving base station 2 after transmitting the cell change indication message, the UE 1 can perform a cell change to the target base station 3, and the target base station 3 can request the serving base station 2 to forward data to be transmitted to the UE 1. In this case, the serving base station 2 forwards the data to be transmitted to the UE 1 to the target base station 3 in response to the request from the target base station 3.

Next, a process for a UE to determine the timing of cell change in the handover method according to the second exemplary embodiment of the present invention will be described in detail.

Figure 13:
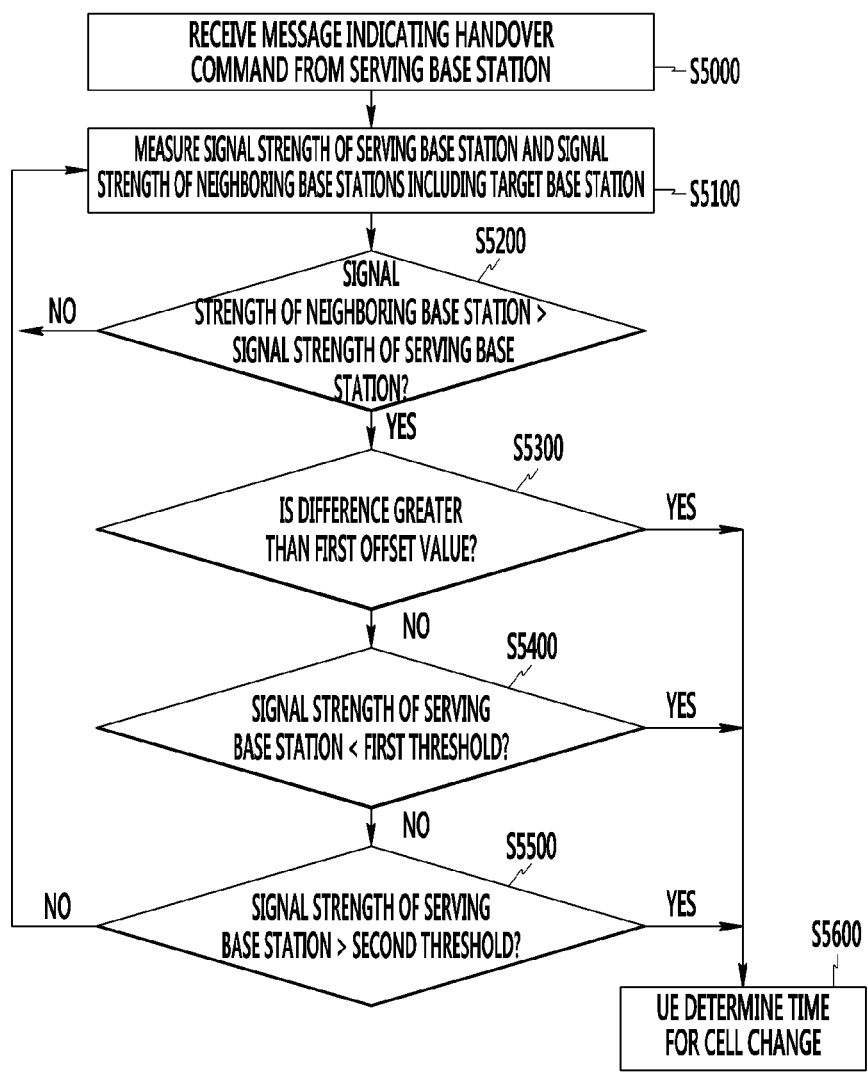
FIG. 13 is a flowchart of a process for a UE to determine the timing of cell change in the handover method according to the second exemplary embodiment of the present invention.

FIG. 13 is a flowchart of a process for a UE to determine the timing of cell change in the handover method according to the second exemplary embodiment of the present invention.

The UE 1 does not perform cell change immediately after receiving a cell change command message from the serving base station 2, but instead backups the cell change command message and determines the appropriate timing for cell change. The UE 1 measures the signal strength of the serving base station 2 and the signal strength of neighboring base stations including the target base station 3, and compares the signal strength measurements (S5000, S5100). Here, the signal strength of neighboring base stations including the target base station is compared with the signal strength of the serving base station to determine whether a cell change execution event has occurred or not.

Figure 14:
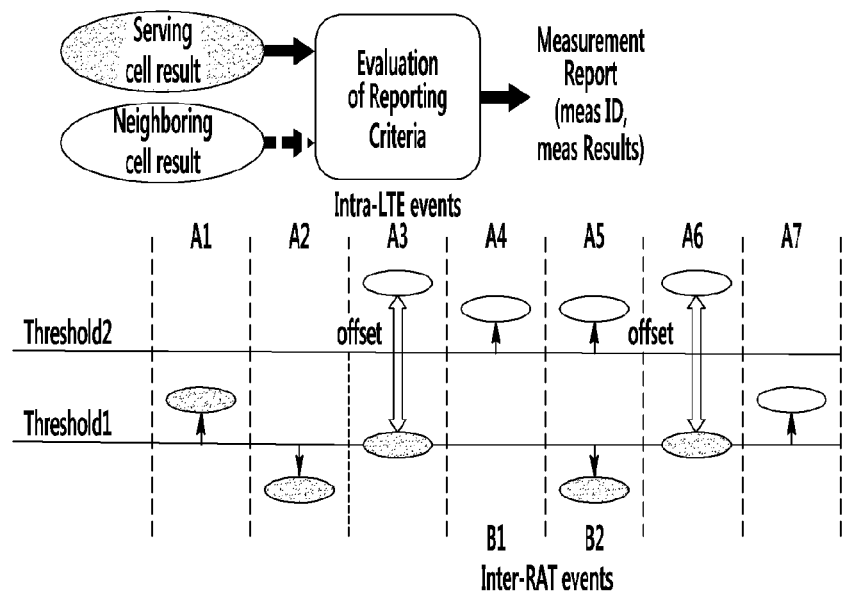
FIG. 14 is an illustration of event occurrence based on signal strength in the handover method according to the second exemplary embodiment of the present invention.

FIG. 14 is an illustration of event occurrence based on signal strength in the handover method according to the second exemplary embodiment of the present invention.

As a comparison result, if the signal strength of a neighboring base station is greater than the signal strength of the serving base station (S5200), the UE 1 determines that a cell change execution event has occurred and it is time for cell change as long as the signal strength of the neighboring base station is greater than the signal strength of the serving base station by a first offset value (e.g., 6 dB) or more (S5300 and S5600). In the exemplary embodiment of the present invention, a cell change execution event indicates that it is more desirable for the UE to perform a handover to the target base station than to maintain a wireless connection with the serving base station.

Moreover, if the signal strength of the neighboring base station is maintained greater than the signal strength of the serving base station by a second offset value or more during a given time (e.g., TTE (Time to Execute)), the UE determines that it is time for cell change. Further, if the signal strength of the neighboring base station is greater than the signal strength of the serving base station and the signal strength of the serving base station is less than a predetermined first threshold (Threshold 1) (A2 of FIG. 14), the UE 1 determines that a cell change execution event has occurred and it is time for cell change (S5400 and S5600).

In addition, if the signal strength of the neighboring base station is greater than the signal strength of the serving base station and the signal strength of the serving base station is greater than a predetermined second threshold (Threshold 2) (A4 of FIG. 14), the UE 1 determines that a cell change execution event has occurred and it is time for cell change (S5500 and S5600). A cell change execution event according to an exemplary embodiment of the present invention is not limited to those described above.

Meanwhile, even if the signal strength of the neighboring base station is greater than the first threshold (Threshold 1) (A7 of FIG. 14), the UE 1 determines that a cell add preparation event has occurred. Once the cell addition preparation event has occurred, the UE 1 determines that it is time for cell addition. For example, a cell addition event indicates making an additional connection while one of the plurality of small cells included in the macro cell serves as the serving cell when the UE is connected to the macro cell which is the primary cell. In this case, a cell change event may indicate changing the serving cell to one of the neighboring cells when the UE is connected to one (serving cell) of the plurality of small cells in the macro cell.

After determining that a cell addition event has occurred and it is time for cell addition, the UE 1 may perform cell addition to make an additional connection to a new cell.

While the UE determines the timing for cell change in the above-described handover method, the UE 1 also may determine the target base station to which handover is to be performed. That is, the UE 1 may determine the target base station based on the measured signal strength of the neighboring base stations. For example, a neighboring base station having a greater signal strength than the serving base station by the first offset value or more may be selected as the target base station to which cell change is to be performed, from among the neighboring base stations having a greater signal strength than the serving base station. The UE 1 may receive one or more cell change command messages. In this case, the target base station for each cell change command message is different. At this time, the UE 1 may determine the optimal target base station to which cell change is to be performed, while determining the optimal timing for cell change.

In the handover method according to the second exemplary embodiment of the present invention, if the difference in signal strength between the serving base station and the target base station is an HOM (Handover Margin) (ex. 3 dB) or more, the UE immediately transmits a measurement report message to the serving base station. For example, if the signal strength of a neighboring cell is greater than the signal strength of the serving base station by the second offset value or more, it is determined that a cell change preparation event has occurred, and a measurement report message may be transmitted to the serving base station.

The UE may receive one or more cell change command messages for different target base stations, each of which contains information about a new cell to which the UE will move. The UE does not immediately perform cell change after receiving a cell change command message, but instead backups the received cell change command message and continuously compares the signal strength of the serving base station and the signal strength of neighboring cells (particularly including the new cell whose information is contained in the cell change command message), selects the best target cell at the best timing when cell change is required, and performs a cell change to the corresponding target base station.

A handover apparatus for performing handover will be described below.

Figure 15:
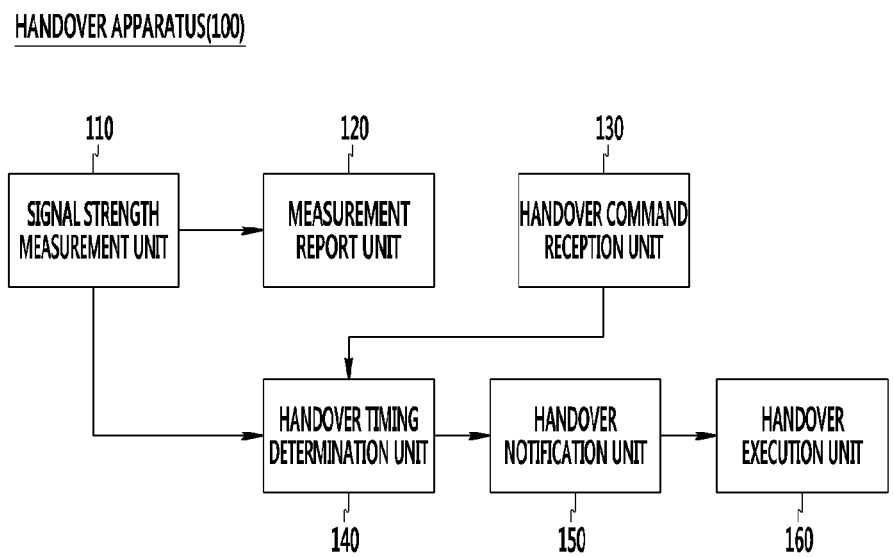
FIG. 15 is a view showing the structure of a handover apparatus according to an exemplary embodiment of the present invention.

FIG. 15 is a view showing the structure of a handover apparatus according to an exemplary embodiment of the present invention.

As shown in FIG. 15, a handover apparatus 100 according to an exemplary embodiment of the present invention includes a signal strength measurement unit 110, a measurement report unit 120, a handover command reception unit 130, a handover timing determination unit 140, a handover notification unit 150, and a handover execution unit 160.

The signal strength measurement unit 110 receives signals sent from neighboring base stations including a serving base station and a target base station, and measures the strength of the received signals signal.

The measurement report unit 120 transmits a measurement report message containing channel state information to the serving base station, based on the signal strength measurements received from the base stations.

The handover command reception unit 130 receives a message indicating a handover command from the serving base station and backups the message for the handover timing determination. For example, the handover command reception unit 130 receives an RRC connection reconfiguration message for configuring a neighboring base station as the target base station. The RRC connection reconfiguration message may function as a cell change command message containing information about a new neighboring cell to which the UE will move and information about the old cell from which the UE will move.

The handover timing determination unit 140 determines the timing for handover (including cell change). After receiving a message indicating a handover command message, the appropriate timing for handover, i.e., the timing of reconfiguring a connection to the target base station, is determined based on the signal strength measurements of the base stations provided from the signal strength measurement unit 110, and the target base station is also determined.

Specifically, if a first event occurs in which the signal strength of a neighboring base station including the target base station is greater than the signal strength of the serving base station by a first offset value or more, it is determined that it is time for handover.

If the signal strength of the target base station is maintained greater than the signal strength of the serving base station by a second offset value or more during a given time (e.g., TTE (Time to Execute)), it is determined that a second event has occurred.

If a third event occurs in which the signal strength of the neighboring base station is greater than the signal strength of the serving base station and the signal strength of the serving base station is less than a predetermined first threshold, it is determined that it is time for handover. Otherwise, if a fourth event occurs in which the signal strength of the neighboring base station is greater than the signal strength of the serving base station and the signal strength of the serving base station is less than a predetermined second threshold, it is determined that it is time for handover. Also, the handover timing determination unit 140 determines the best target base station from among the target base stations selected by the serving base station 2.

Moreover, if the signal strength of the neighboring base station is greater than the first threshold, the handover timing determination unit 140 determines that a cell add preparation event has occurred, which corresponds to the timing for cell add.

If the handover timing determination unit 140 determines that now is time for handover, the handover notification unit 150 generates a handover indication message and transmits it to the serving base station. The handover indication message can be transmitted by the above-described first to third notification methods, and can be repeatedly transmitted for reliability.

The handover execution unit 160 performs handover after the handover indication message is transmitted or upon receiving a response message indicating that the handover indication message is properly received from the serving base station.

As the handover apparatus 100 performs handover based on base station signal strength measurement results acquired in real time from the UE, the success rate of handover can be increased and data interruption time during handover can be significantly reduced. Additionally, the timing of handover can be synchronized between a UE and base stations in most cases.

The exemplary embodiments of the present invention may be implemented through the above-described apparatus and/or method, and may also be implemented with a program for realizing the functions corresponding to the elements of the exemplary embodiments of the present invention, and a recording medium storing the program. These implementations may be easily achieved from the description of the exemplary embodiments by a person of ordinary skill in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A handover method for a UE (user equipment), the method comprising:
   the UE receiving a handover command message from a serving base station;
   the UE performing cell selection to determine the best cell to handover based on the handover command message;
   the UE transmitting a handover indication message to the serving base station if it is determined that the handover is to be performed; and
   the UE performing handover,
   wherein a determining of the handover is at a timing different from a timing of receiving the handover command message.

2. The method of claim 1, wherein the UE performing cell selection to determine the best cell to handover comprises:
   the UE measuring continuously the signal strength of the serving base station and the signal strength of neighboring base stations including a target base station after receiving the handover command message; and
   determining whether a handover execution event has occurred or not, based on the signal strength of the serving base station and the signal strength of the neighboring base stations, to determine the timing of handover.

3. The method of claim 2, wherein in the determining of the timing of handover, if a handover execution event occurs, it is determined that it is time for handover, and
   the handover execution event occurs if the signal strength of the target base station is greater than the signal strength of the serving base station by a first offset value or more, if the signal strength of the target base station is maintained greater than the signal strength of the serving base station by a second offset value or more during a given time TTE (Time to Execute), if the signal strength of the target base station is greater than the signal strength of the serving base station and the signal strength of the serving base station is less than a predetermined first threshold, and if the signal strength of the target 10 station is greater than the signal strength of the serving base station and the signal strength of the target base station is greater than a predetermined second threshold,
   wherein, if at least one of the events occurs, it is determined that it is time for handover.

4. The method of claim 1,
   wherein, in the transmitting of a handover indication message, the handover indication message is transmitted by either a first notification method for issuing a handover notification by using a MAC 20 control element, a second notification method for issuing a handover notification by using an RRC (radio resource control) message, or a third notification method for issuing a handover notification by using a PHY (physical) channel,
   wherein, in the first notification method, an LCID (logical channel identifier) indicating a handover indication message is defined and used, and the cell ID of a target base station for the handover is included in the message, and in the second notification method, the cell ID of a target base station for the handover is included in the RRC message.

5. The method of claim 1, wherein, in the transmitting of a handover indication message, the handover indication message is repeatedly transmitted.

6. The method of claim 1, further comprising the UE receiving a response message for the handover indication message from the serving base station after transmitting the handover indication message, wherein, in the UE 20 performing of handover, if an ACK (acknowledgment) response message indicating the successful reception of the handover indication message is received from the serving base station, handover is performed.

7. The method of claim 1, further comprising the serving base station transmitting the response message to the UE, and
   the serving base station transmits the response message to the UE by using either a method for transmitting an ACK response message or NACK 20 (Negative ACK) response message through a PHICH (Physical Hybrid ARQ Indicator Channel) channel or a method for transmitting an ACK response message or NACK response message through RLC (radio link control).

8. The method of claim 1,
   wherein UE performing cell selection to determine the best cell to handover further comprises determining the target base station to which the UE will perform handover,
   wherein, in the transmitting of a handover indication message, the UE includes and transmits the determined cell ID of the target base station in the handover indication message.

9. The method of claim 1, further comprising, prior to the receiving of a handover command message from the serving base station, if a handover preparation event occurs, the UE transmitting to the serving base station a measurement report message including the signal strength of the serving base station and the signal strength of the neighboring base stations,
   wherein the handover preparation event occurs if the signal strength of a neighboring base station is greater than the signal strength of the serving base station by the second offset value or more.

10. The method of claim 1, wherein the handover command message is an RRC connection reconfiguration message for configuring one of the neighboring base stations as a target base station, and in the receiving of a handover command message, the UE receives one or more handover command messages each containing the cell ID of a different target base station, and in the UE performing cell selection to determine the best cell to handover, the UE determines the timing of reconfiguring a wireless connection to the target base station and select one of the neighboring base stations as the target base station.

11. The method of claim 1, wherein, in the UE performing of handover, if 10 information indicating whether the UE has to perform a RACH (random access channel) procedure is contained in the handover command message, the RACH procedure is performed on the target base station.

12. A handover method for a UE (user equipment) in a network where small cells and a macro cell coexist, the handover method comprising:
   the UE receiving a cell change command message from a serving base station corresponding to a currently connected cell, the cell change command message containing at least either one of information about the old cell from which the UE will move or information about a new cell to which the UE will move;
   the UE determining whether to perform cell change or not after receiving the cell change command message; and
   when performing cell change, the UE performing a change from the currently connected old cell to the new cell based on the information contained in the cell change command message,
   wherein the cell change is a change of a small cell that the UE connected to by assistance of the macro cell and a determining of the cell change is at a timing different from a timing of receiving the cell change command message.

13. The method of claim 12, wherein the performing of change comprises:
   when performing cell change, if the cell change command message contains both the information about the old cell and the information about the new cell, the UE cutting off the connection with the old cell and connecting to the new cell; and
   when performing cell change, if the cell change command message contains only the information about the new cell, the UE connecting to the new cell,
   wherein the cell change command message comprises at least one among a first field (Cell add) containing information about the new cell to which the UE will move and a second field (Cell release) containing information about the old cell from which the UE will move.

14. The method of claim 12, further comprising, prior to the performing of a change to the new cell, if it is determined that the cell change is to be performed, the UE transmitting a cell change indication message to the serving base station.

15. The method of claim 12, wherein the determining of whether to perform cell change or not comprises:
   the UE measuring the signal strength of the serving base station and the signal strength of neighboring cells; and
   the UE determining whether a cell change execution event has occurred or not, based on the signal strength of the serving base station and the signal strength of the neighboring cells, to determine the timing of cell change,
   wherein the cell change execution event occurs if the signal strength of the neighboring cells is greater than the signal strength of the serving base station by a first offset value or more, if the signal strength of the neighboring cells is maintained greater than the signal strength of the serving base station by a second offset value or more during a given time TTE (Time to Execute), if the signal strength of the neighboring cells is greater than the signal strength of the serving base station and the signal strength of the serving base station is less than a predetermined first threshold, and if the signal strength of the neighboring cells is greater than the signal strength of the serving base station and the signal strength of the neighboring cells is greater than a predetermined second threshold, and
   if at least one of the events occurs, it is determined that it is time for handover,
   wherein, in the determining of the timing for cell change, if the signal strength of the neighboring cells is greater than the first threshold, it is determined that a cell add preparation event has occurred, which is the timing for cell change.

16. The method of claim 12, further comprising, if the serving base station is a base station corresponding to a macro cell and the old cell to which the UE is connected and the new cell to which the UE will move are small cells included in the macro cell, the UE transmitting a cell change complete message to the target base station after completion of the cell change.

17. A handover apparatus comprising:
   a signal strength measurement unit that receives signals sent from a serving base station and neighboring base stations including a target base station and measures the strength of the received signals;
   a measurement report unit that transmits a measurement report message containing channel state information based on the signal strength measurements made by the signal strength measurement unit to the serving base station;
   a handover command reception unit that receives from the serving base station an RRC (radio resource control) connection reconfiguration message for configuring a neighboring base station as the target base station and backups that message for handover timing determination;
   a handover timing determination unit that determines and selects the target base station and the timing of reconfiguring a connection to the target base station;
   a handover notification unit that generates a handover indication message indicating that the timing of reconfiguring a connection to the target base station is determined and the target base station is selected, and transmits the same to the serving base station; and
   a handover execution unit that reconfigures a connection to the target base station.

18. The of claim 17, wherein the handover timing determination unit determines that it is time for handover if at least one of first through fourth events occurs,
   the first through fourth events comprising the first event that occurs when the signal strength of a neighboring base station is greater than the signal strength of the serving base station by a first offset value or more, the second event that occurs when the signal strength of the neighboring base station has been greater than the signal strength of the serving base station by a second offset value or more, the third event that occurs when the signal strength of the neighboring base station is greater than the signal strength of the serving base station and the signal strength of the serving base station is less than a predetermined first threshold, and the fourth event that occurs when the signal strength of the neighboring base station is greater than the signal strength of the serving base station and the signal strength of the neighboring base station is greater than a predetermined second threshold.

19. The apparatus of claim 17, wherein, if the serving base station is a base station corresponding to a macro cell and the old cell to which a UE (user equipment) is connected and the new cell to which the UE will move are small cells included in the macro cell, the RRC connection reconfiguration message is a cell change command message including a first field (Cell add) containing information about a new cell to which the UE will move and a second field (Cell release) containing information about the old cell from which the UE will move.

20. The method of claim 18, wherein, if the serving base station is a base station corresponding to a macro cell and the signal strength of the neighboring base station is greater than the first threshold, the handover timing determination unit determines that a cell add preparation event has occurred, which is the timing for cell change,
   wherein a cell add event indicates making an additional connection while one of the plurality of small cells included in the macro cell serves as the serving cell when the UE is connected to the macro cell which is the primary cell.

* * * * *